United States Patent [19]

Osawa et al.

[11] Patent Number: 5,027,784
[45] Date of Patent: Jul. 2, 1991

[54] PCV SYSTEM WITH A CHECK VALVE DEVICE

[75] Inventors: Kouichi Osawa; Yukihiro Sonoda, both of Susono, Japan

[73] Assignee: Toyota Jidosha Kabushiki Kaisha, Toyota, Japan

[21] Appl. No.: 561,940

[22] Filed: Aug. 2, 1990

[30] Foreign Application Priority Data

Aug. 9, 1989 [JP] Japan .................................. 1-92967[U]
May 16, 1990 [JP] Japan .................................. 2-50333[U]

[51] Int. Cl.⁵ .............................................. F02M 25/00
[52] U.S. Cl. .................................... 123/572; 137/854; 137/516.13
[58] Field of Search .................... 123/572, 573, 574; 137/516.13, 843, 854

[56] References Cited

U.S. PATENT DOCUMENTS

| | | | |
|---|---|---|---|
| 4,513,784 | 4/1985 | Farrand et al. | 137/854 |
| 4,549,520 | 10/1985 | Tamba et al. | 123/572 |
| 4,593,672 | 6/1986 | Barone | 123/573 |
| 4,711,224 | 12/1987 | Eckhardt | 123/572 |

FOREIGN PATENT DOCUMENTS

| | | |
|---|---|---|
| 64-011804 | 10/1985 | Japan . |
| 60-178320 | 11/1985 | Japan . |
| 61-005309 | 1/1986 | Japan . |
| 61-017113 | 1/1986 | Japan . |
| 61-181169 | 11/1986 | Japan . |

Primary Examiner—Andrew M. Dolinar
Assistant Examiner—M. Macy
Attorney, Agent, or Firm—Kenyon & Kenyon

[57] ABSTRACT

A PCV system with a check valve device oriented in a vertical direction and including a valve body, a seat member, and a stopper plate. The valve body includes a valve head constructed of elastomer. The seat member includes a valve seat surface on a lower surface thereof. The seat member further includes at least one perforation which opens into the lower surface. The valve head of the valve body is disposed below the valve seat surface so as to resiliently contact the valve seat surface when no differential pressure acts on the valve. A stopper plate is disposed between the lower surface of the seat member and the valve head of the valve body. The stopper plate prevents the valve head from being excessively deformed into the perforation to cause cracks to develop in the valve head. As a result, the durability of the check valve device is improved.

9 Claims, 6 Drawing Sheets

PCV SYSTEM WITH A CHECK VALVE DEVICE

BACKGROUND OF THE INVENTION

1. Field of the Invention

The present invention relates to a positive crankcase ventilation (PCV) system including a check valve device.

2. Description of the Prior Art

Japanese Patent Publication SHO 64-11804 discloses a PCV system which includes a PCV line connecting a crankcase of an internal combustion engine to a portion of an intake passage of the engine located downstream of a throttle valve, a PCV valve disposed in the PCV line, and an oil mist trap chamber disposed in the PCV line downstream of the PCV valve.

Also, Japanese Utility Model Publication SHO 60-178320 discloses a check valve as shown in FIG. 11 which could be used for returning trapped oil collecting on a bottom wall of the trap chamber to a portion of the PCV line located upstream of the PCV valve. The check valve 100 includes a valve body 102 having a valve head formed of elastomer and a seat member 104 which the valve body 102 resiliently contacts. The seat member 104 includes perforations 106 which are opened and closed by the valve head of the valve body 102. FIG. 12 illustrates that when a negative pressure acts on the intake passage side of the check valve 100 and the perforations 106 are closed by the valve head, portions of the elastomeric valve head of the valve body 102 protrude into the perforations 106, causing excessive deformation of the valve head. After repeated excessive deformations, a crack will initiate in the valve head and will develop to finally break the valve head. Once the elastomeric valve head breaks, the volume of PCV gas flow will increase, making the air/fuel ratio of the intake gas lean and increasing oil consumption.

SUMMARY OF THE INVENTION

An object of the present invention is to provide a PCV system with a check valve device where a valve head of a valve body of the check valve device is prevented from being excessively deformed and the durability of the check valve device is greatly improved.

The above-described object can be attained by a PCV system with a check valve device in accordance with the present invention which includes a PCV line connecting a cylinder head cover to an intake passage of an internal combustion engine; a PCV valve disposed in the PCV line; a trap chamber disposed in the PCV line downstream of the PCV valve for trapping oil mist, the trap chamber having a bottom wall on which oil trapped by the trap chamber collects; and a check valve device provided at the bottom wall of the trap chamber so as to be substantially vertically oriented. The check valve device includes a valve body having a valve head formed of elastomer; a seat member having a lower surface that comprises a valve seat surface and at least one perforation; and a stopper plate interposed between the lower surface of the seat member and the valve head of the valve body.

The stopper plate prevents the valve head from being extruded into the perforation of the seat member when a negative pressure acts on the check valve device. As a result, durability of the valve head is greatly improved.

BRIEF DESCRIPTION OF THE DRAWINGS

The above and other objects, features and advantages of the present invention will become more apparent and will be more readily appreciated from the following detailed description of the preferred exemplary embodiments of the invention taken in conjunction with the accompanying drawings, in which.

DETAILED DESCRIPTION OF THE PREFERRED EMBODIMENTS

Figure 10:
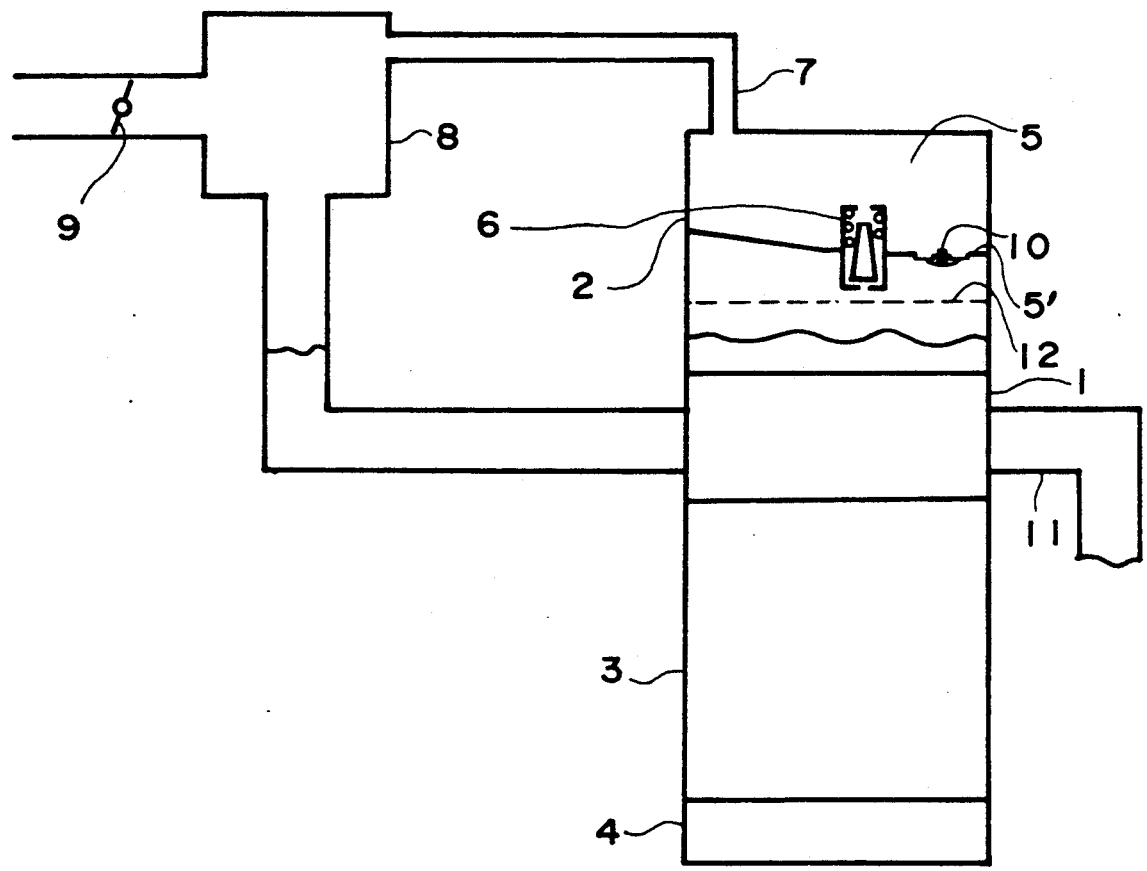
FIG. 10 is a schematic elevational view of a PCV system in accordance with any one of the first through fifth embodiments of the present invention.
Figure 11:
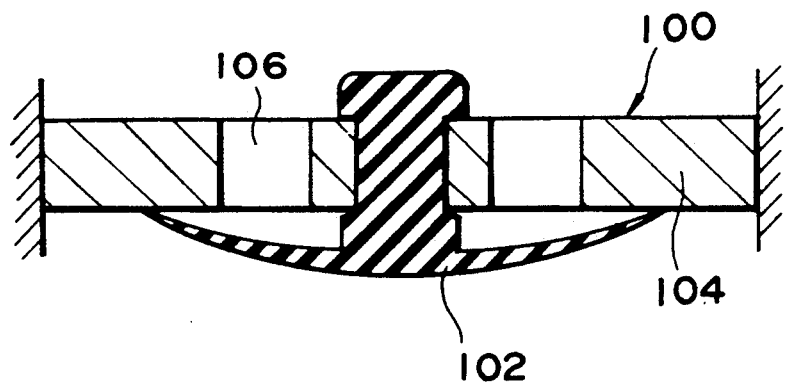
FIG. 11 is a cross-sectional view of a check valve disclosed in Japanese Utility Model Publication SHO 60-178320.
Figure 12:
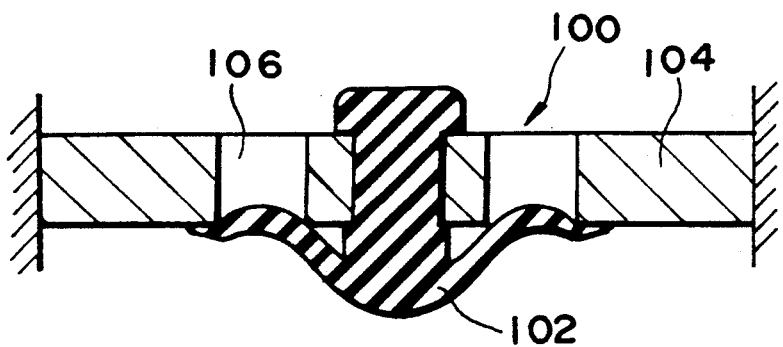
FIG. 12 is a cross-sectional view of the check valve of FIG. 11 illustrating how a valve head of the check valve will be deformed when a negative pressure acts on the upper side of the check valve.

FIG. 10 illustrates a positive crankcase ventilation (PCV) system of an internal combustion engine with a check valve device in accordance with the invention. As illustrated in FIG. 10, the internal combustion engine includes a cylinder head 1, a cylinder head cover 2, a cylinder block 3, and an oil pan 4. The PCV system includes a PCV line 7 connecting the cylinder head cover 2 to a portion of an intake passage 8 of the internal combustion engine at a location downstream of a throttle valve 9. A PCV valve 6 is provided for controlling flow of blowby gas in the PCV line 7. A baffle plate 12 provided in the cylinder head cover 2 acts as a primary trap for oil mist contained in the blowby gas. A trap chamber 5 on the downstream side of the PCV valve 6 serves as a secondary trap for oil mist in the blowby gas. Oil mist trapped in the trap chamber 5 collects on a bottom wall 5' of the trap chamber 5.

Blowby gas which has leaked past a piston into a crankcase of the cylinder block 3 flows into the cylinder head cover 2 through a path formed in the cylinder block 3 and the cylinder head 1. The blowby gas, controlled by the PCV valve 6, then flows through the PCV line 7 into the intake passage 8 of the engine to be burned in the combustion chamber. While passing through the space between the cylinder head 1 and cylinder head cover 2, the blowby gas is mixed with oil mist. The oil mist is separated from the blowby gas firstly by the baffle plate 12 and then by the trap chamber 5. When the blowby gas flows from the PCV valve 6 into the trap chamber 5, the blowby gas expands adiabatically, and the oil mist condenses to liquid oil which collects on the bottom wall 5' of the trap chamber 5.

To return the collected oil to the upstream side of the PCV valve 6, a check valve device 10 is disposed at the bottom wall 5' of the trap chamber 5. Five embodiments of the check valve devices 10 which can be used in the PCV system will be explained below.

Firstly, check valve device structures common to all the embodiments will be explained with reference to FIGS. 1 to 3.

Figure 1:
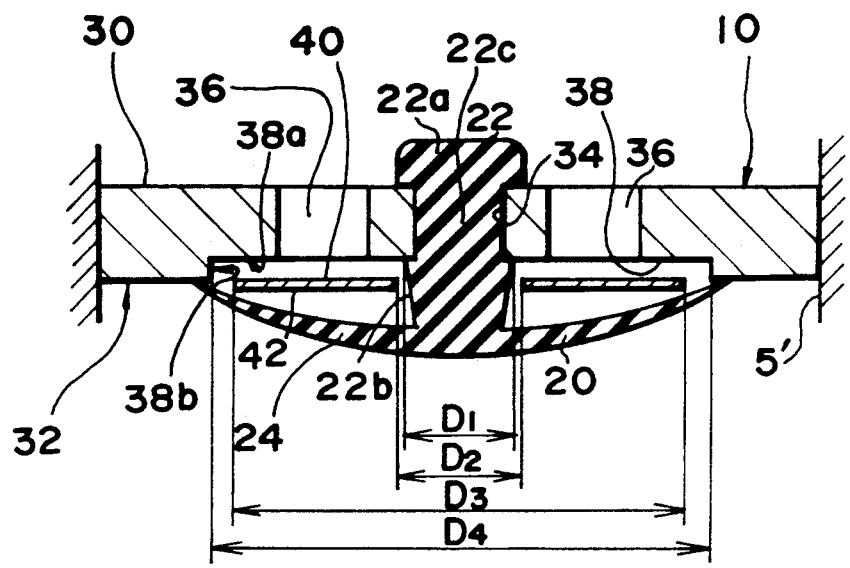
FIG. 1 is a cross-sectional view of a check valve device used in a PCV system in accordance with a first embodiment of the present invention.

As illustrated in FIG. 1, the check valve device 10 has an axis oriented in a substantially vertical direction and generally includes a valve body 20, a seat member 30, and a stopper plate 40.

Figure 4:
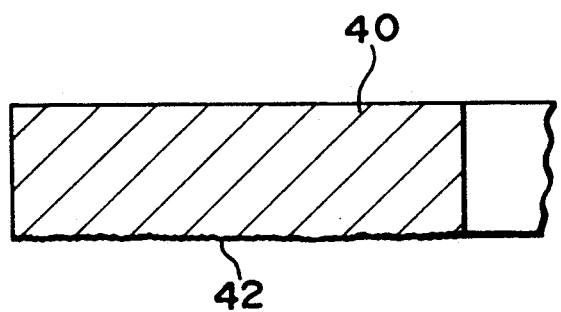
FIG. 4 is a partial, enlarged cross-sectional view of a stopper plate of a check valve device used in a PCV system in accordance with a second embodiment of the present invention.

More particularly, the valve body 20 includes a valve stem which extends substantially vertically and may be constructed of elastomer, for example, rubber. The valve body 20 further includes a valve head 24 formed of elastomer, for example, rubber. The valve head 24 extends radially outward and obliquely upward from a lower end portion of the valve stem 22. The seat member 30 is configured to be a horizontally extending, substantially flat plate. At least one portion of a lower surface of the seat member functions as a valve seat surface 32 which the valve head 24 of the valve body 20 detachably contacts. A hole 34 located in a radially central portion of the seat member 30 receives the valve stem to secure the valve body 20 to the seat member 30. At least one perforation 36 is provided in a portion of the seat member 30 located radially outward from the center hole 34. FIG. 4 shows four perforations 36 in the seat member 30. The stopper plate 40 is an annular rigid plate and is interposed between the portion of the lower surface of the seat member 30 containing the perforations 36 and the valve head 24 of the valve body 20. The stopper plate 40 prevents the valve head 24 of the valve body 20 from being extruded into the perforations 36 when a negative pressure acts on the valve head 24 via the perforations 36. As a result, crack initiation in the valve head 24 is prevented and durability of the valve body 20 increases.

The radially outer portion of the valve head 24 contacts the valve seat surface 32 of the seat member 30 to close the check valve device when no differential pressure acts on the valve head 24. The valve head 24 will be deformed in a direction away from the valve seat surface 32 of the seat member 30 to open the check valve device 10 by the weight of oil collecting on the valve head 24. The thickness of the valve head 24 is gradually reduced in a direction away from the valve stem 22 so that the valve head 24 can smoothly be deformed when collected oil pushes the valve head downward.

The valve stem 22 includes an upper portion 22a located above the seat member 30, a lower portion 22b located below the seat member 30, and an intermediate portion 22c located between the upper and lower portions 22a and 22b. Because the valve body 20 is pressure-inserted into the center hole 34 of the seat member 30, the upper portion 22a and the lower portion 22b of the valve stem 22 resiliently bulge in the radial direction after insertion so that the valve body 20 is axially secured to the seat member 30 by the upper and lower portions 22a and 22b.

The seat member 30 includes a recessed portion 38 in the lower surface of the seat member 30. The recessed portion 38 opens to the valve seat surface 32. The recessed portion 38 includes a bottom surface 38a extending perpendicular to the substantially vertical axis of the check valve device 10 and a cylindrical side surface 38b axially extending between the bottom surface 38a and the valve seat surface of the seat member 30. Each perforation 36 opens into the bottom surface 38a of the recessed portion 38. As illustrated in FIG. 3, the depth of the recessed portion 38 is selected to be substantially equal to the thickness of the stopper plate 40 so that a lower surface 42 of the stopper plate 40 and the lower surface of the seat member 30 lie in the same horizontal plane when the stopper plate 40 is moved upward by the valve head 24 to contact the bottom surface 38a of the recessed portion 38 in response to negative pressure in the intake passage of the engine. As a result, no step-like excessive deformation will be caused in the valve head 24 of the valve member 20 at a portion of the valve head 24 corresponding to the radially outer edge of the stopper plate 40. Therefore, excellent durability of the valve body 20 is maintained despite the provision of the stopper plate 40.

As illustrated in FIG. 1, the recessed portion 38 of the seat member 30 has a diameter greater than an outer diameter $D_3$ of the stopper plate 40 and less than the diameter of the valve head 24 of the valve body 20. More particularly, the outer diameter $D_3$ of the stopper plate 40 and the diameter $D_4$ of the recessed portion 38 are determined so as to satisfy the following relationship:

$$D_4 > (D_2 - D_1) + D_3$$

where $D_1$ is a maximum diameter of the lower portion 22b of the valve stem 22 of the valve body 20, and $D_2$ is an inner diameter of the annular stopper plate 40. According to the above-described relationship, the stopper plate 40 can be housed in the recessed portion 38 of the seat member 30 without interfering with the side surface 38b of the recessed portion 38.

The lower portion 22b of the valve stem 22 is tapered or reduced in diameter in a direction away from the bottom surface 38a of the recessed portion 38 of the seat member 30. Due to this taper, the stopper plate 40 can move smoothly relative to the lower portion 22b of the valve stem 22 of the valve body 20 even though the lower portion 22b of the valve stem 22 of the valve body 20 is accompanied by a dimensional deviation due to the bulging. If there were no taper, greater clearances would be needed between the lower portion of the valve stem and the stopper plate and in turn between the outer portion of the stopper plate and the side surface of the recessed portion. As a result, the valve head might be excessively deformed into the increased clearance between the stopper plate and side surface of the recessed portion, and the durability of the valve body would be decreased.

Next, check valve device structures specific to each embodiment will be explained. With respect to all the embodiments, the same or similar members are denoted with the same reference numerals.

Figure 2:
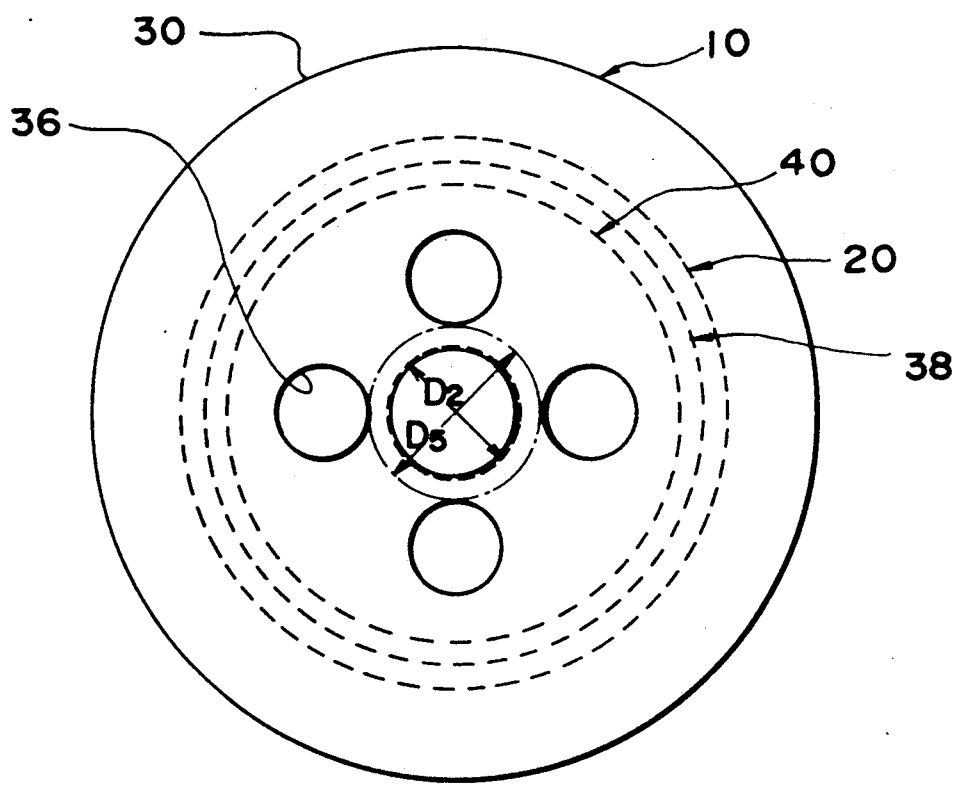
FIG. 2 is a top plan view of the check valve device of FIG. 1.
Figure 3:
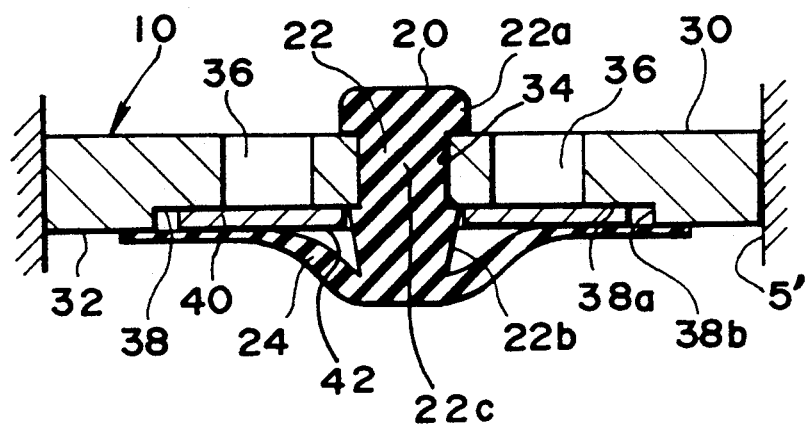
FIG. 3 is a cross-sectional view of the check valve device of FIG. 1 illustrating how a valve head of the check valve device will be deformed when a negative pressure acts on the intake passage side of the check valve device.

In the first embodiment illustrated in FIGS. 1 to 3, the stopper plate 40 has an inner diameter $D_2$ smaller than a diameter $D_5$ (see FIG. 2) of a circle which tangentially contacts radially innermost edges of all of the perforations 36. As a result, the stopper plate 40 extends over the entire cross-sectional areas of all the perforations 36.

When a negative pressure occurs on the upper side of the check valve device 10, the valve head 24 moves the stopper plate 40 to contact the bottom surface 38a of the recessed portion 38 (see FIG. 3). Then, when the negative pressure changes to atmospheric pressure, the valve head 24 should resiliently move in the direction should drop downward. However, if the lower surface of he stopper plate 40 were a very smooth surface, the valve head 24 might continue to closely contact the lower surface 42 of the stopper plate 40 and, as a result, the check valve device 10 might continue to be closed even after the engine intake pressure changed from a negative value to atmospheric pressure. The second through fifth embodiments propose various means for preventing such a lock of the check valve device 10.

In the second embodiment, illustrated in FIG. 4, the stopper plate 40 has a lower surface 42 (a surface opposing the valve head 24) having a roughness greater than 400 microns. Due to this roughened lower surface 42 of the stopper plate 40, when a negative pressure in the intake passage changes to atmospheric pressure, air at this pressure can enter between the lower surface 42 of the stopper plate 40 and the upper surface of the valve head 24 to allow the stopper plate 40 and the valve head 24 to separate from each other. As a result, the valve head 24 can easily move downward and the check valve device 10 can easily open when a negative pressure acting on the upper side of the check valve device 10 changes to atmospheric pressure.

Figure 5:
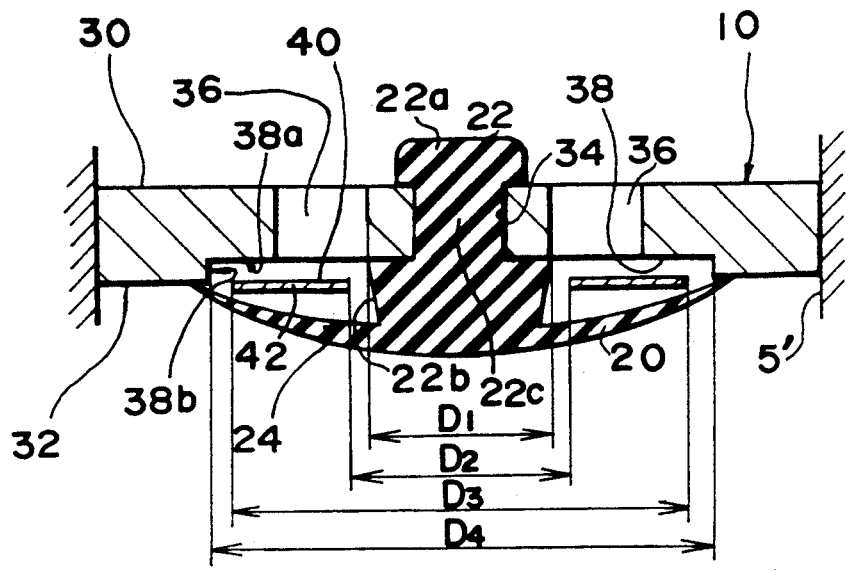
FIG. 5 is a cross-sectional view of a check valve device used in a PCV system in accordance with a third embodiment of the present invention.
Figure 6:
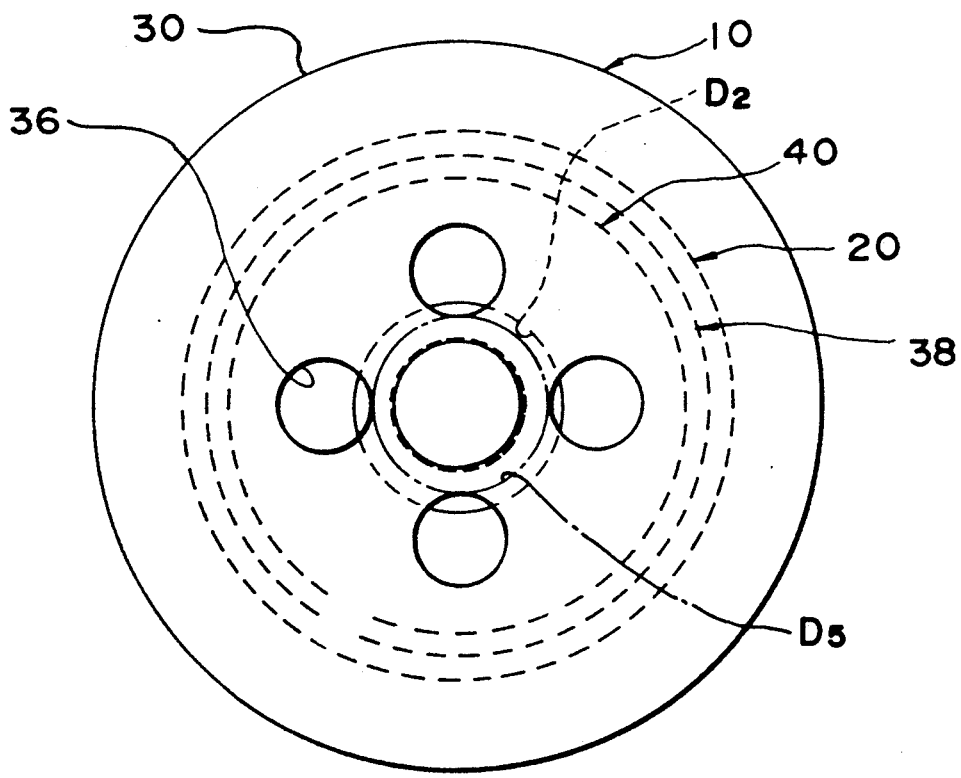
FIG. 6 is a top plan view of the check valve device of FIG. 5.

In the third embodiment, illustrated in FIGS. 5 and 6, the stopper plate 40 has an inner diameter greater than a diameter of a circle which is tangent to the radially innermost edges of the perforations 36. As a result, a portion of each perforation 36 is not covered by the stopper plate 40 when the stopper plate 40 contacts the bottom surface 38a of the recessed portion 38 of the seat member 30. Therefore, when a negative pressure in the intake passage changes to atmospheric pressure, air at this pressure can easily enter between the lower surface 42 of the stopper plate 40 and the upper surface of the valve head 24 of the valve body 20. As a result, the check valve device 10 can be smoothly opened when a negative pressure in the intake passage changes to atmospheric pressure.

Figure 7:
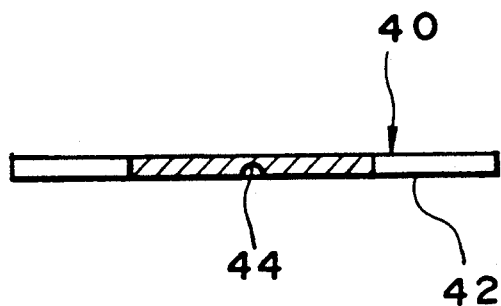
FIG. 7 is a cross-sectional view taken in the direction of arrows 7 in FIG. 8 of a stopper plate of a check valve device used in a PCV system in accordance with a fourth embodiment of the present invention.
Figure 8:
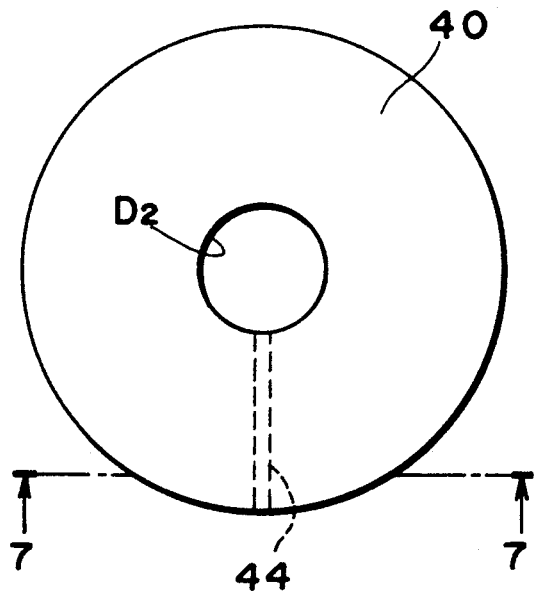
FIG. 8 is a top plan view of the stopper plate of FIG. 7.

In the fourth embodiment, illustrated in FIGS. 7 and 8, the lower surface 42 of the stopper plate 40 has a groove 44 extending from the inner diameter to the outer diameter of the stopper plate 40. When a negative pressure in the intake passage changes to atmospheric pressure, air at this pressure can enter the groove 44, and the valve head 24 can move apart from the stopper plate 40. As a result, the check valve device 10 will open smoothly.

Figure 9:
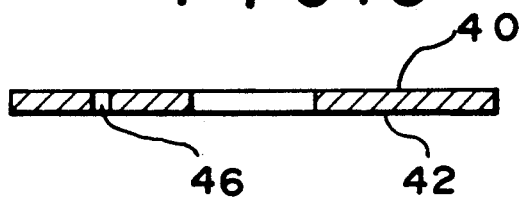
FIG. 9 is a cross-sectional view of a stopper plate of a check valve device used in a PCV system in accordance with a fifth embodiment of the present invention.

In the fifth embodiment, illustrated in FIG. 9, a small hole 46 penetrates the thickness of the stopper plate 40. When a negative pressure in the intake passage changes to atmospheric pressure, air at this pressure can enter through the small hole 46 to the lower side of the stopper plate 40, and the valve head 24 of the valve body 20 can smoothly move apart from the stopper plate.

Next, operation of the PCV system with a check valve device of the present invention will be explained.

When the engine operates, a negative pressure acts on the intake passage side of the check valve device. When the engine stops, the negative pressure in the intake passage changes to atmospheric pressure. While the engine operates, the blowby gas flows through the PCV line 7 to the intake passage 8 of the engine due to the negative intake pressure. When the blowby gas flows in the PCV line 7, the oil mist and evaporated oil included in the blowby gas are firstly trapped by the baffle plate 12 and then are trapped by the trap chamber 5. The oil trapped by the trap chamber 5 collects on the bottom wall 5' of the trap chamber 5, and the level of the collected oil will increase because the check valve device 10 remains shut while the engine operates. In this way, a negative intake pressure, atmospheric pressure, and a trapped oil pressure repeatedly act on the check valve device 10.

When the pressure of the collecting oil exceeds a predetermined value during operation of the engine, or when the pressure on the intake passage side of the check valve device 10 changes from a negative pressure to atmospheric pressure, and the collected oil pushes the valve head 24 downward, the valve head 24 is deformed to open the check valve device 10. When the check valve device 10 is opened, the collected oil will return to the cylinder head 1 and finally to the oil pan 4.

When a negative pressure occurs in the trap chamber 5, while atmospheric pressure acts on the lower side of the valve head, the valve head 24 contacts the stopper plate 40 and is prevented from being excessively deformed into the perforations 36 as shown in FIG. 3. More particularly, the stopper plate 40 prevents the valve head 24 from being cracked by excessive deformation and greatly improves the durability of the check valve device 10. Furthermore, even if cracks do develop in the valve head 24, the stopper plate 40 will operate to at least partially close the check valve device 10 when a negative pressure acts on the check valve device 10 and can prevent the air/fuel ratio of the engine from becoming too lean.

In the case where the recessed portion 38 is formed in the lower portion of the seat member 30 and the depth of the recessed portion is selected to be substantially equal to the thickness of the stopper plate 40, the lower surface 42 of the stopper plate 40 and the lower surface of the seat member 30 are in the same plane when the check valve is shut and, as a result, the valve head 24 of the valve body 20 is prevented from causing a step-like deformation at the radially outer edge of the stopper plate 40. Therefore, good durability of the check valve device 10 can be maintained despite provision of the stopper plate 40.

In the case where the lower portion 22b of the valve stem 22 of the valve body 20 is tapered in a direction away from the bottom surface 38a of the recessed portion 38 formed in the seat member 30, a smooth movement of the stopper plate 40 relative to the valve stem 22 can be obtained without providing such large radial clearances between the inner edge of the stopper plate 40 and the valve stem 22 and, consequently, between the outer edge of the stopper plate 40 and the side surface 38b of the recessed portion 38 that the valve head 24 might be deformed into the clearance between the stopper plate and the side of the recessed portion, and the durability of the valve body 20 would be degraded.

In the case where the lower surface 42 of the stopper plate is roughened so as to have a roughness greater than 400 microns, air can enter between the lower surface 42a of the stopper plate 40 and the upper surface of the valve head 24 when the intake pressure acting on the check valve device 10 changes from a negative value to atmospheric pressure. As a result, the check valve device is not locked and can be smoothly opened.

In the case where the inner diameter of the annular stopper plate 40 is formed greater than a diameter of a circle tangent to radially innermost edges of the perforations 36, the check valve device 10 can be smoothly opened.

In the case where a small hole 46 is formed in the stopper plate 40, the check valve device 10 can be smoothly opened.

Although several embodiments of the present invention have been described in detail, it will be appreciated by those skilled in the art that various modifications and alterations can be made without materially departing from the novel teachings and advantages of the present invention. Accordingly, it is to be understood that all such modifications and alterations are included within the spirit and scope of the present invention as defined by the following claims.

What is claimed is:

1. A positive crankcase ventilation system with a check valve device comprising:
   a PCV line connecting a cylinder head cover to an intake passage of an internal combustion engine;
   a PCV valve disposed in the PCV line;
   a trap chamber disposed in the PCV line downstream of the PCV valve for trapping oil mist, the trap chamber having a bottom wall on which oil trapped in the trap chamber collects; and
   a check valve device provided at the bottom wall of the trap chamber so as to be substantially vertically oriented, the check valve device including:
   a valve body having a vertically extending valve stem and a valve head extending radially outward from a lower end portion of the valve stem, the valve head being constructed of elastomer;
   a seat member including a valve seat surface at a lower surface of the seat member, center hole means containing the valve stem of the valve body, and at least one perforation penetrating the seat member to open in the lower surface of the seat member in a region between the center hole means and the radially outward extent of the valve head, the valve head of the valve body being disposed below the seat member so as to resiliently contact the valve seat surface; and
   an annular rigid stopper plate loosely disposed opposite the region of the perforations between the lower surface of the seat member and the valve head of the valve body.

2. The positive crankcase ventilation system with a check valve device according to claim 1, wherein the valve stem of the valve body is constructed of elastomer and includes an upper portion positioned above the seat member, a lower portion positioned below the seat member, and an axially intermediate portion positioned in the center hole means of the seat member between the upper portion and the lower portion of the valve stem, the upper portion and the lower portion of the valve stem bulging radially outward from the center hole means to axially secure the valve body to the seat member.

3. The positive crankcase ventilation system with a check valve device according to claim 1, wherein the seat member includes a recessed portion in the lower surface of the seat member for receiving the stopper plate, a depth of the recessed portion being substantially equal to a thickness of the stopper plate.

4. The positive crankcase ventilation system with a check valve device according to claim 1, wherein the seat member includes a recessed portion in the lower surface of the seat member for receiving the stopper plate, a diameter of the recessed portion being determined so as to satisfy the following relationship:

$$D_4 > (D_2 - D_1) + D_3$$

where
   $D_1$ is a maximum diameter of a lower portion of the valve stem which is positioned below the seat member,
   $D_2$ is an inner diameter of the annular stopper plate,
   $D_3$ is an outer diameter of the annular stopper plate, and
   $D_4$ is the diameter of the recessed portion.

5. The positive crankcase ventilation system with a check valve device according to claim 1, wherein the valve stem includes a lower portion which is positioned below the seat member, the lower portion of the valve stem being tapered so as to be reduced in diameter in a direction away from the lower surface of the seat member.

6. The positive crankcase ventilation system with a check valve device according to claim 1, wherein the stopper plate includes a lower surface roughened so as to have a roughness greater than 500 microns.

7. The positive crankcase ventilation system with a check valve device according to claim 1, wherein the annular stopper plate has an inner diameter greater than a diameter of a circle which is tangent to radially innermost edges of a plurality of said at least one perforation formed in the stopper plate.

8. The positive crankcase ventilation system with a check valve device according to claim 1, wherein the stopper plate includes a groove in a lower surface portion of the stopper plate, the groove extending from the inner diameted to the outer diameter of the annular stopper plate.

9. The positive crankcase ventilation system with a check valve device according to claim 1, wherein the stopper plate has a small perforation extending through the thickness of the stopper plate.

* * * * *

UNITED STATES PATENT AND TRADEMARK OFFICE
CERTIFICATE OF CORRECTION

PATENT NO. : 5,027,784

DATED : July 2, 1991

INVENTOR(S) : Kouichi OSAWA, et al.

It is certified that error appears in the above-identified patent and that said Letters Patent is hereby corrected as shown below:

Column 4, line 46, instead of the line reading "40. According", "According" should start a new paragraph.

Column 5, line 14, between "direction" and "should" insert --away from the seat member 30, and the stopper plate 40--.

Column 5, line 15, change "he" at end of line to --the--.

Column 8, line 53, change "diameted" to --diameter--.

Signed and Sealed this

Sixth Day of April, 1993

Attest:

STEPHEN G. KUNIN

Attesting Officer

Acting Commissioner of Patents and Trademarks